United States Patent [19]
Ichikawa

[11] 3,785,871
[45] Jan. 15, 1974

[54] BRINE BATTERY
[76] Inventor: Masahide Ichikawa, No. 13-11, 1-chome, Hino, Tokyo, Japan
[22] Filed: July 10, 1972
[21] Appl. No.: 270,545

[52] U.S. Cl............................................. 136/100 M
[51] Int. Cl. .......................................... H01m 17/00
[58] Field of Search .................. 136/100 M, 100 R, 136/83 R, 26–27, 112–114, 90, 134–135, 169–170, 175–176, 36, 65, 67

[56] References Cited
UNITED STATES PATENTS
3,481,790 12/1969 Duddy............................. 136/100 R
2,492,206 12/1949 White et al. ..................... 136/100 R
2,365,600 12/1944 Schorger................................ 136/26
3,466,194 9/1969 Duddy .................................. 136/26

Primary Examiner—Anthony Skapars
Attorney—John J. McGlew et al.

[57] ABSTRACT

The present invention relates to a brine battery comprising an anode body made of metallic magnesium or a compound thereof and a cathode body made of an oxide of lead, both of these electrodes being fixedly secured to an insulating mounting plate at mutually opposed position, both said electrodes being further capable of being freely soaked into or taken out of non-tight-enclosed brine or sea water.

4 Claims, 4 Drawing Figures

PATENTED JAN 15 1974 3,785,871

BRINE BATTERY

BACKGROUND AND SUMMARY OF THE INVENTION

The so-called sea-water battery in which sea water is used as electrolyte is already known in the form of Ag-Cl—Mg battery as well as a battery of cathodic oxidants such as $CuSO_4$, $Cu_2Cl_2$, etc. However, these oxidants have various defects such as high cost, meltability and lowering of volume efficiency.

The present invention has been developed to improve on the art and remove these defects, and the said invention relates to a brine battery comprising an anode, body made of metallic magnesium or a compound thereof and a cathode body made of an oxide of lead, both of these electrodes being fixedly secured to an insulating mounting plate at mutually opposed position, both of said electrodes being further capable of being freely soaked into or taken out of non-tight-enclosed brine or sea water.

DESCRIPTION OF SPECIFIC EMBODIMENTS

Figure 1:
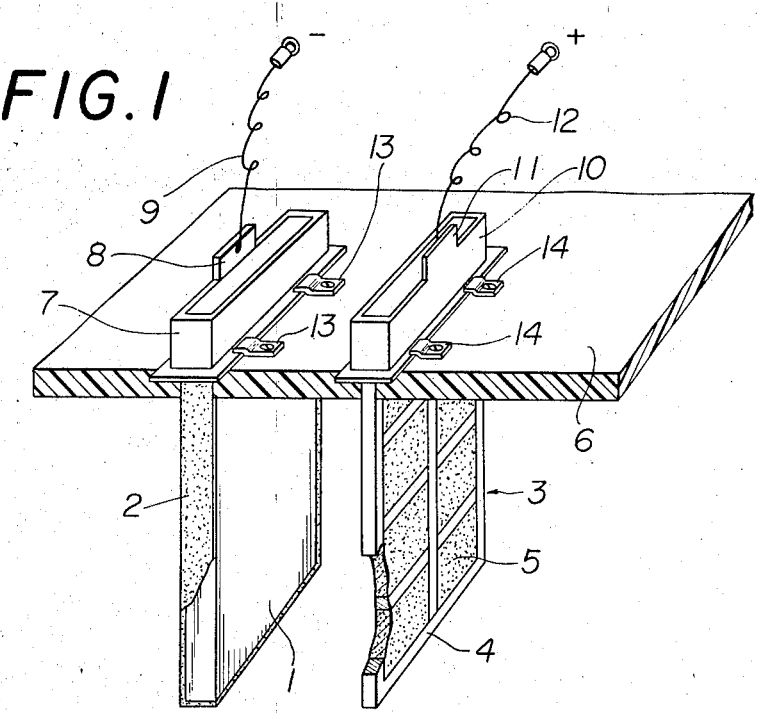

Now, an embodiment of the brine battery according to the present invention is explained referring to FIG. 1. In the FIG., 1 is an anode body consisting of metallic magnesium (Mg) plate; 2 is a masking film covering one surface of said anode body 1 for the purpose of preventing said surface from being ionized; 3 is an electrode body or cathode made by filling paste-like material 5 composed of trilead tetraoxide ($Pb_3O_4$), dilute sulfuric acid ($H_2SO_4$), etc., into open spaces of a lattice-like base plate 4 formed of an alloy of lead (Pb) and antimony (Sb) and drying said filled paste material; 6 is a mounting plate made of synthetic resin, to which both anode 1 and cathode 3 are freely detachably mounted; 7 is a negative electricity collector; 8 is an outlet of negative electricity; 9 is a lead wire with a terminal for connection to the negative pole of the load; 10 is a positive electricity collector; 11 is an outlet of positive electricity; 12 is a lead wire with a terminal for connection to the positive pole of the load; 13, 13 are movable clamps for freely detachably securing the anode body 1 to the mounting plate 6 and 14, 14 are movable clamps for freely detachably securing the cathode body 3 to the mounting plate 6.

According to the present invention, when the cathode body and anode body are soaked in, for example, brine as described above, an electrode potential of −2.37 V is produced between the anode body, namely, metallic magnesium (Mg), and the brine, while an electrode potential of −0.17 V is generated between the cathode body, namely lead (Pb), and the brine. Therefore, if the cathode and anode are short-circuited via the load, a potential difference of $(−0.17 V) − (−2.37 V) = +2.20 V$ is produced between the two electrode bodies, with a result that a voltage of +2.20 V is applied to the load.

Thus, the brine battery of the present invention comprising an anode body made of metallic magnesium or a compound thereof a cathode body made of an oxide of lead has the decided advantage of being capable of supplying a high voltage of +2.20 V as mentioned above when the cathode body and anode body are soaked together into brine or sea water.

If said cathode body and anode body are soaked in tight-enclosed brine or sea water for a long period of time for prolonged production of electric energy, the cathode, anode and brine or sea water will chemically react with each other, forming magnesium chloride ($MgCl_2$), sodium hydroxide (NaOH) and hydrogen ions ($H^+$), and these products will be accumulated on the surfaces of and between the two electrode bodies, thereby reducing their electromotive voltage and thus shortening the effective life of the cell. In the brine battery of the present invention, said cathode and anode bodies are soaked in non-tight-enclosed brine or sea water, so that the accumulation of said magnesium chloride ($MgCl_2$), sodium hydroxide (NaOH) and hydrogen ions ($H^+$) near the electrode bodies is impossible. Further, the hydrogen ions ($H^+$) react with oxygen in the cathode body consisting of an oxide of lead to form water ($H_2O$), thereby ensuring a substantial advantage of long life for the brine battery of the present invention. Furthermore, if the cathode and anode bodies are freely detachably mounted on the mounting plate made of insulating material as shown in the example above, it is possible to dismantle the cathode body and anode body separately, and therefore another advantage is obtained in that if either of these electrode bodies has become unusable, for example, it can be replaced or cleaned singly, namely, independently of the other electrode body, and accordingly with much simplicity and quick action. In addition, since the cathode and anode bodies can be easily soaked into or taken out of brine or sea water, they are pulled out of brine or sea water when the cell is not used. This will prevent natural electric discharge and thus will prevent lowering of the electromotive capacity of each of the cathode and anode bodies, which proves to be a great practical advantage.

Figure 2:
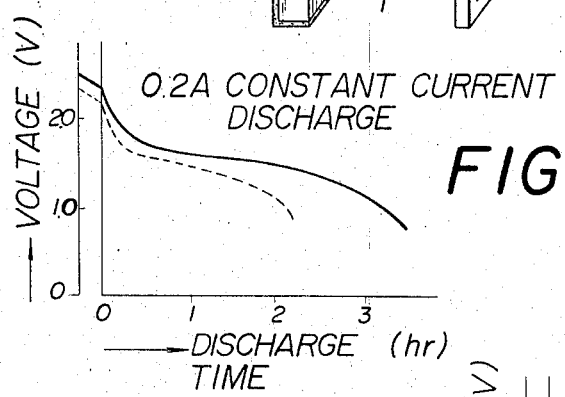
Figure 3:
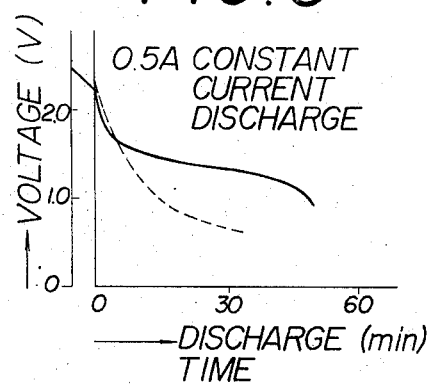
Figure 4:
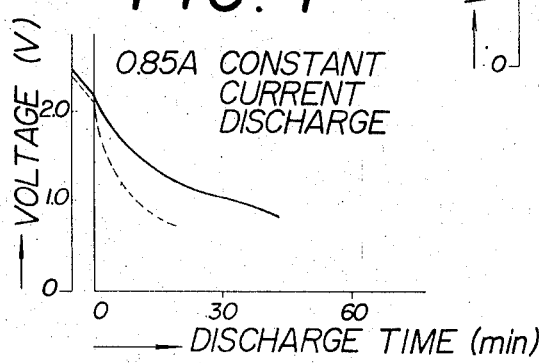

For the purpose of comparison of the electric discharge characteristic between the brine battery of the present invention and a conventional brine battery, one each of such batteries having nearly the same resistance value were selected and their resistances were set at $0.16 - 0.5\Omega$. Using 3% NaCl solution as electrolyte and setting the distance between two electrodes at 1 mm, a test of the discharge of the cells was conducted. Anode plates consisting of magnesium plate having a thickness of 0.4 mm were placed on both sides of the lead electrode, and continuous discharge was conducted at constant current of 0.2 A, 0.5 A and 0.85 A. The results are shown in FIGS. 2, 3 and 4, in which the dotted lines represent the results of conventional brine battery while the continuous lines represent the results of the brine battery according to the present invention. The discharge was started one minute after pouring 25 cc of electrolyte. The results of these tests indicate that in comparison with the conventional brine battery, the brine battery of the present invention is superior in discharge characteristics and the more so as the current becomes as high as 0.85 A (0.5 − 1.0 hour in discharge time) and that generally the discharge time of the present invention is longer.

I claim:

1. A brine battery of improved construction comprising
   a. an anode made of magnesium in form of metal or compound;
   b. low cost cathode having improved volume efficiency, and resistance to melting, consisting of a lattice-like base plate having open spaces provided therein with solidified powder of an oxide of lead and a masking film covering one surface of said anode for preventing said surface from being oxidized; and c. an insulating mounting plate which secures said cathode body and anode body at mutually opposite detachable positions, said electrode bodies being capable of being freely soaked into or taken out of non-tight enclosed brine or sea water.

2. The battery according to claim 1, wherein the anode comprises metallic magnesium.

3. The battery according to claim 1, wherein the cathode comprises a paste composed of lead tetraoxide and dilute sulfuric acid in a lattice-like base plate formed of lead-antimony alloy.

4. The battery according to claim 3, wherein the anode comprises metallic magnesium.

* * * * *